United States Patent
Akase et al.

(10) Patent No.: US 9,777,618 B2
(45) Date of Patent: Oct. 3, 2017

(54) CONTROLLER FOR INTERNAL COMBUSTION ENGINE

(71) Applicant: TOYOTA JIDOSHA KABUSHIKI KAISHA, Toyota-shi (JP)

(72) Inventors: Takatoshi Akase, Toyota (JP); Masahiko Asano, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 15/151,918

(22) Filed: May 11, 2016

(65) Prior Publication Data

US 2017/0037807 A1 Feb. 9, 2017

(30) Foreign Application Priority Data

Aug. 5, 2015 (JP) .................. 2015-155146

(51) Int. Cl.
*F01P 7/16* (2006.01)
*F02P 5/04* (2006.01)
(Continued)

(52) U.S. Cl.
CPC .............. *F01P 7/16* (2013.01); *F02D 35/023* (2013.01); *F02D 35/025* (2013.01);
(Continued)

(58) Field of Classification Search
CPC ...... F01P 7/16; F02D 41/0077; F02D 35/023; F02D 35/025; F02D 41/005; F02D 41/34; *F02D 41/005* (2013.01); *F02D 41/0007* (2013.01); *F02D 41/0077* (2013.01); *F02D 41/34* (2013.01); *F02P 5/04* (2013.01); *F02P 5/152* (2013.01); *F02D 2200/021* (2013.01)

(56) References Cited

U.S. PATENT DOCUMENTS 5,606,117 A * 2/1997 Vogel .................. G01L 9/0052
73/114.18
8,522,750 B2 * 9/2013 Flanagan ............... F02B 25/04
123/435

(Continued)

FOREIGN PATENT DOCUMENTS

JP 4-252832 9/1992
JP 2001-280165 10/2001
(Continued)

*Primary Examiner* — Joseph Dallo
(74) *Attorney, Agent, or Firm* — Oblon, McClelland, Maier & Neustadt, L.L.P.

(57) ABSTRACT

A controller for an internal combustion engine includes a combustion pressure sensor and a temperature calculator. The combustion pressure sensor has a pressure receiver, a semiconductor device, and a detection circuit. The pressure receiver is arranged in a combustion chamber. The internal pressure applied to the pressure receiver is transmitted to the semiconductor device, and the resistance value of the semiconductor device is changed in accordance with own temperature and own deformation caused by the internal pressure. The detection circuit outputs power in accordance with the pressure applied to the pressure receiver and the temperature of the semiconductor device. The temperature calculator calculates a temperature of the combustion chamber based on an output of the detection circuit at the time when a combustion pressure is not acting on the pressure receiver.

11 Claims, 8 Drawing Sheets (51) Int. Cl.
    *F02D 41/00*     (2006.01)
    *F02D 41/34*     (2006.01)
    *F02P 5/152*     (2006.01)
    *F02D 35/02*     (2006.01)

(58) Field of Classification Search
    CPC ............ F02D 41/0007; F02D 2200/021; F02P 5/152; F02P 5/04
    See application file for complete search history.

(56) References Cited

U.S. PATENT DOCUMENTS

| | | | |
|---|---|---|---|
| 8,656,898 B2 * | 2/2014 | Sackmann | F02D 35/023 123/612 |
| 2001/0027783 A1 | 10/2001 | Hiraya et al. | |
| 2002/0043524 A1 | 4/2002 | Taniguchi et al. | |
| 2008/0270006 A1 | 10/2008 | Asano et al. | |
| 2009/0320576 A1 | 12/2009 | Borgers et al. | |
| 2010/0089364 A1 * | 4/2010 | Flanagan | F02B 25/04 123/435 |
| 2011/0220073 A1 * | 9/2011 | Sackmann | F02D 35/023 123/623 |

FOREIGN PATENT DOCUMENTS

| | | |
|---|---|---|
| JP | 2001-336468 | 12/2001 |
| JP | 2005-351173 | 12/2005 |
| JP | 2008-267350 | 11/2008 |
| JP | 2009-215943 | 9/2009 |
| JP | 2010-8416 | 1/2010 |
| JP | 2013-68539 | 4/2013 |

* cited by examiner

Fig. 5A
Output Voltage
VO of Output
Ciruict

Fig. 5B
Output Voltage
V2 of Bottom-hold
Circuit

CONTROLLER FOR INTERNAL COMBUSTION ENGINE

BACKGROUND OF THE INVENTION

The present invention relates to a controller for an internal combustion engine that detects the temperature inside a combustion chamber.

For example, Japanese Laid-Open Patent Publication No. 2001-336468 discloses a device for detecting the temperature inside a combustion chamber. The device of the publication includes a glow plug, which is heated by supplying a current to a hot wire inside. The glow plug is attached to an internal combustion engine with one end exposed in a combustion chamber. The glow plug has a thermocouple located at a portion exposed to the combustion chamber. The thermocouple is configured to detect the temperature in the combustion chamber of the internal combustion engine.

In the above-described device, a thermocouple, which detects the temperature of the combustion chamber of the internal combustion engine, needs to be provided, which inevitably increases the costs.

SUMMARY OF THE INVENTION

Accordingly, it is an objective of the present invention to provide a controller for an internal combustion engine that is configured to detect the temperature of a combustion chamber of an internal combustion engine, while limiting cost increase.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A controller for an internal combustion engine according to one embodiment will now be described.

Figure 1:
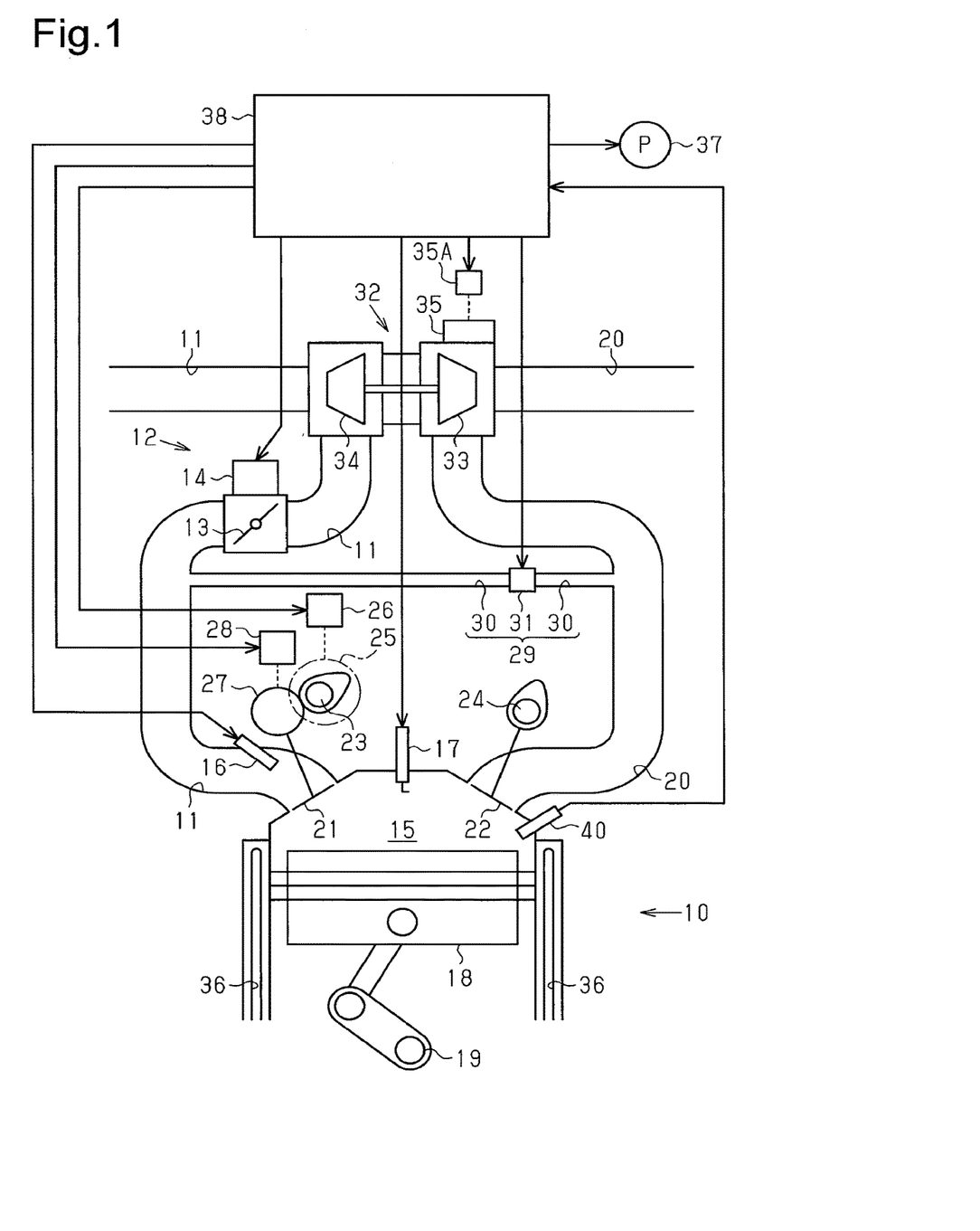
FIG. 1 is a schematic diagram showing a controller for an internal combustion engine according to one embodiment.

As shown in FIG. 1, an intake passage 11 of an internal combustion engine 10 is provided with a throttle mechanism 12. The throttle mechanism 12 includes a throttle valve 13 and a throttle motor 14. The throttle motor 14 is controlled to adjust the opening degree of the throttle valve 13. This adjusts the amount of air drawn into a combustion chamber 15 through the intake passage 11 (the intake air amount). The intake passage 11 is also provided with an injector 16. The injector 16 injects fuel into the intake passage 11.

In the combustion chamber 15 of the internal combustion engine 10, the igniting action by an ignition plug 17 ignites and burns air-fuel mixture, which contains intake air and injected fuel. The combustion causes a piston 18 to reciprocate, causing a crankshaft 19 to rotate. The burned air-fuel mixture is discharged from the combustion chamber 15 to an exhaust passage 20 as exhaust gas.

In the internal combustion engine 10, the intake passage 11 and the combustion chamber 15 are selectively connected to and disconnected from each other by opening and closing actions of an intake valve 21. In the internal combustion engine 10, the combustion chamber 15 and the exhaust passage 20 are selectively connected to and disconnected from each other by opening and closing actions of an exhaust valve 22. The intake valve 21 is opened and closed by rotation of an intake camshaft 23, to which rotation of the crankshaft 19 is transmitted. The exhaust valve 22 is opened and closed by rotation of an exhaust camshaft 24, to which rotation of the crankshaft 19 is transmitted.

The intake camshaft 23 has a variable valve timing mechanism 25. The variable valve timing mechanism 25 adjusts the rotational angle of the intake camshaft 23 relative to the rotational angle of the crankshaft 19 (the crank angle), thereby advancing or retarding the valve timing of the intake valve 21 (the intake valve timing VT). The variable valve timing mechanism 25 is controlled through activation of an actuator 26. To change the intake valve timing VT, the opening timing and the closing timing of the intake valve 21 are advanced or retarded together while maintaining, at a constant value, the valve duration VL of the intake valve 21 (the crank angle from when the intake valve 21 is opened to when the intake valve 21 is closed).

A variable valve duration mechanism 27 is provided between the intake camshaft 23 and the intake valve 21. The variable valve duration mechanism 27 is configured to vary the valve duration VL of the intake valve 21 in accordance with the engine operating condition. The variable valve duration mechanism 27 is controlled through activation of an actuator 28. The operation of the variable valve duration mechanism 27 changes the valve duration VL of the intake valve 21 in synchronization with the maximum lift. For example, the shorter the valve duration VL, the smaller the maximum lift becomes. An increase in the valve duration VL means that separation of the valve opening timing and the valve closing timing of the intake valve 21 increases, that is, that the time in which the intake valve 21 is open is extended.

The internal combustion engine 10 is provided with a turbocharger 32. The turbocharger 32 has a turbine wheel 33 arranged in the exhaust passage 20. A compressor wheel 34 is arranged in the intake passage 11 at a position upstream of the throttle valve 13. Exhaust gas is directed onto the turbine wheel 33 to rotate the turbine wheel 33. Accordingly, the compressor wheel 34 is rotated to forcibly deliver air from the intake passage 11 into the combustion chamber 15.

The turbocharger 32 is of a variable nozzle vane type that is configured to vary the relationship between the operation range of the internal combustion engine 10 and the amount of forced induction. That is, the turbocharger 32 has a variable nozzle mechanism 35, which includes nozzle vanes for adjusting the flow rate of exhaust gas directed onto the turbine wheel 33. The nozzle vanes are arranged to surround the turbine wheel 33 about the axis of the turbine wheel 33 at equal angular intervals. The nozzle vanes are opened or closed in synchronization by an actuator 35A so that the clearance between the adjacent nozzle vanes is altered. This adjusts the flow rate of the exhaust gas directed onto the turbine wheel 33 so that the rotational speed of the turbine wheel 33 is adjusted. Accordingly, the amount of air forcedly delivered to the combustion chamber 15 is adjusted.

The internal combustion engine 10 further includes an exhaust gas recirculation (EGR) device 29, which returns some of the exhaust gas from the exhaust passage 20 to the intake passage 11. The EGR device 29 includes an EGR passage 30, which connects a section of the intake passage 11 that is downstream of the throttle valve in the flow of intake air and a section of the exhaust passage 20 that is upstream of the turbine wheel 33 in the flow of exhaust gas. The EGR passage 30 is provided with an EGR valve 31. The opening degree of the EGR valve 31 is adjusted to regulate the amount of exhaust gas returned from the exhaust passage 20 to the intake passage 11 (EGR amount).

The internal combustion engine 10 further includes a water jacket 36, through which coolant circulates, and a water pump 37, which delivers coolant under pressure. The water pump 37 is configured to vary the amount of delivered coolant.

The internal combustion engine 10 is provided with, for example, an electronic control unit 38 including a microcomputer. The electronic control unit 38 receives detection signals from various types of sensors that detect the operating state of the internal combustion engine 10, such as a crank sensor configured to detect the rotational phase (crank angle) of the crankshaft 19. The electronic control unit 38 executes various types of calculations using the detection signals from various types of sensors. Based on the calculation results, the electronic control unit 38 executes various types of control processes such as operation control processes for the throttle mechanism 12, the injector 16, the ignition plug 17, the variable valve timing mechanism 25, the variable valve duration mechanism 27, the EGR valve 31, the variable nozzle mechanism 35, and the water pump 37. In the present embodiment, the electronic control unit 38 functions as a temperature calculator.

In the present embodiment, the various types of sensors include a combustion pressure sensor 40 configured to detect the pressure in the combustion chamber 15.

The structure of the combustion pressure sensor 40 will now be described.

Figure 2:
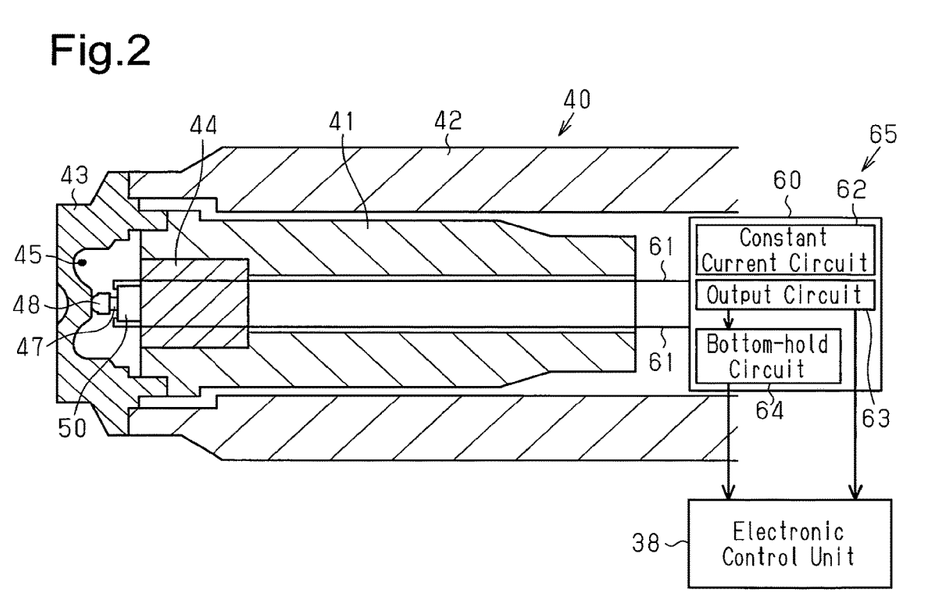
FIG. 2 is a cross-sectional view illustrating a cross-sectional structure of a combustion pressure sensor together with its electrical circuit.

As shown in FIG. 2, the combustion pressure sensor 40 includes an inner housing 41 and an outer housing 42. The inner housing 41 and the outer housing 42 both have a cylindrical shape. The inner housing 41 is inserted in the outer housing 42. A diaphragm 43, which is made of a metal material, is fixed to the distal ends of the inner housing 41 and the outer housing 42 (the left ends as viewed in FIG. 2). The diaphragm 43 has a shape that covers the openings of the inner and outer housings 41, 42. The inner housing 41 accommodates a sealing member 44 in a gap close to the distal end to fill and block the gap.

The combustion pressure sensor 40 has, in a distal portion, a space 45 that is defined by the diaphragm 43, the inner housing 41, and the sealing member 44. The space 45 accommodates a semiconductor device 50, a force transmission block 47, and a coupling member 48. The force transmission block 47 and the coupling member 48 are configured to transmit force acting on the diaphragm 43 to the semiconductor device 50. The semiconductor device 50 is fixed to the distal surface, that is, the left side surface as viewed in FIG. 2, of the sealing member 44. The force transmission block 47 is fixed to the distal surface, that is, the left side surface as viewed in FIG. 2, of the semiconductor device 50. One end of the coupling member 48 is fixed to the force transmission block 47, and the other end of the coupling member 48 contacts the inner surface of the diaphragm 43.

The combustion pressure sensor 40 is attached to the internal combustion engine 10 such that the diaphragm 43, which functions as a pressure receiver, is exposed inside the combustion chamber 15 (refer to FIG. 1). The combustion pressure sensor 40 is structured such that the diaphragm 43 receives the internal pressure (the in-cylinder pressure) of the combustion chamber 15. Therefore, in the combustion pressure sensor 40, the in-cylinder pressure, which acts on the diaphragm 43, acts on the semiconductor device 50 via the coupling member 48 and the force transmission block 47.

Figure 3:
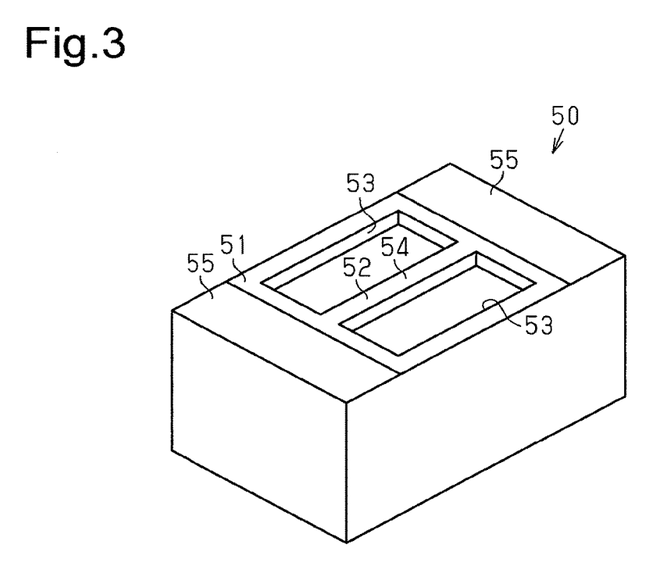
FIG. 3 is a perspective view illustrating the structure of the semiconductor device of the combustion pressure sensor.

As shown in FIG. 3, the semiconductor device 50 is shaped as a substantially rectangular parallelepiped and made of a semiconductor such as silicon. The semiconductor device 50 has a mesa portion 52 on the distal surface, that is, on a machining surface 51 on the upper side as viewed in FIG. 3. The mesa portion 52 protrudes in relation to the surrounding. In the present embodiment, two rectangular grooves 53 are formed in the machining surface 51, for example, through etching. The grooves 53 extend parallel with each other and form the linearly extending mesa portion 52 in between.

The above-described force transmission block 47 (refer to FIG. 2) is fixed to a top surface 54 of the mesa portion 52. The in-cylinder pressure, which acts on the diaphragm 43, is transmitted to the mesa portion 52 via the coupling member 48 and the force transmission block 47. This deforms the mesa portion 52 and changes the resistance value of the mesa portion 52. In this manner, the resistance value of the semiconductor device 50 is changed according to deformation of the semiconductor device 50, specifically, deformation of the mesa portion 52, caused by the in-cylinder pressure.

A pair of terminals 55 is provided on the machining surface 51 of the semiconductor device 50. The terminals 55 are located on the opposite sides of the mesa portion 52. One of the terminals 55 is electrically continuous with one end of the mesa portion 52, and the other terminal 55 is electrically continuous with the other end of the mesa portion 52.

Figure 4:
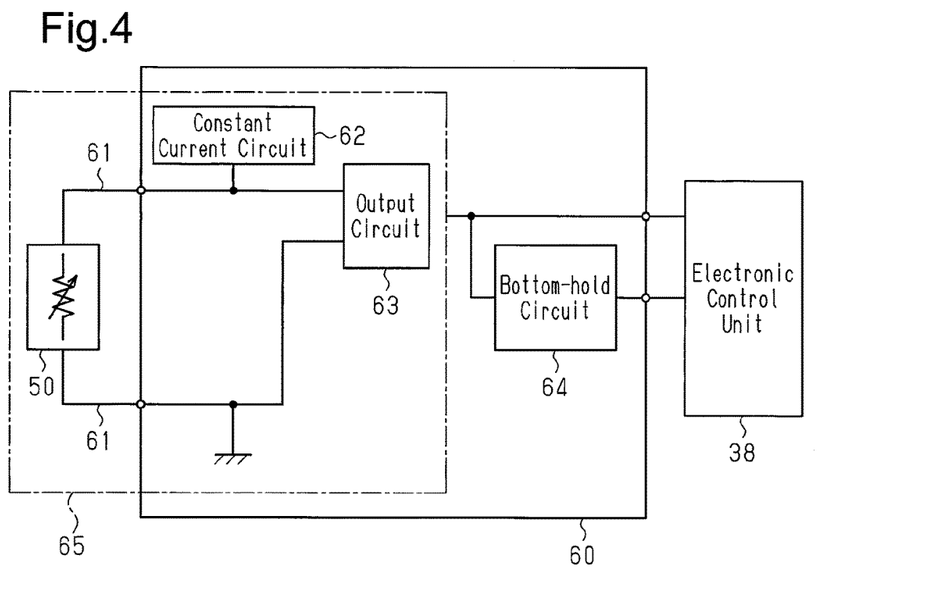
FIG. 4 is a circuit diagram showing the electrical circuit of the combustion pressure sensor.

As shown in FIGS. 2 and 4, the combustion pressure sensor 40 includes a detector 60, which detects an output power. The terminals 55 of the semiconductor device 50 are connected to the detector 60 via lead wires 61. The detector 60 includes a constant current circuit 62, which supplies a constant current. The constant current circuit 62 supplies a constant current to the semiconductor device 50. The detector 60 includes an output circuit 63, which has an operational amplifier. The output circuit 63 detects and outputs the voltage difference between the terminals 55 of the semiconductor device 50 (inter-terminal voltage). In the present embodiment, an electrical circuit that is constituted by the semiconductor device 50, the constant current circuit 62, and the output circuit 63 corresponds to a detection circuit 65, which outputs power in accordance with the pressure applied to the pressure receiver and the temperature of the semiconductor device 50.

An output voltage VO of the output circuit 63 is input to the electronic control unit 38.

The output voltage VO of the output circuit 63 is converted by a bottom-hold circuit 64 and is then input to the electronic control unit 38. The bottom-hold circuit 64 is a known electrical circuit that converts the output voltage VO of the output circuit 63 into a voltage value from which the influence of the temperature of the combustion pressure sensor 40 has been removed and outputs the converted voltage value to the electronic control unit 38.

Figure 5A:
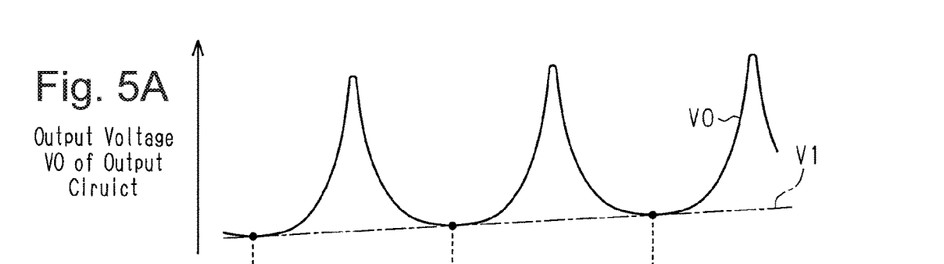
FIG. 5A is a timing diagram showing changes in the output voltage of the output circuit of the combustion pressure sensor.
Figure 5B:
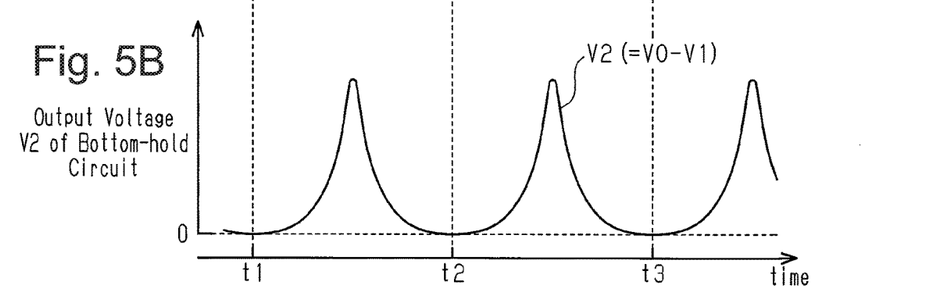
FIG. 5B is a timing diagram showing changes in the output voltage of the bottom-hold circuit of the combustion pressure sensor.

FIG. 5A shows changes in the output voltage VO of the output circuit 63, and FIG. 5B shows the output voltage V2 of the bottom-hold circuit 64.

The output voltage VO of the output circuit 63 is input to the bottom-hold circuit 64. Starting from points in time t1, t2, t3, at which the output voltage VO of the output circuit 63 switches from decrease to increase, the bottom-hold circuit 64 generates a voltage value that gradually increases from the output voltage VO at the time (an output voltage V1 indicated by the long dashed short dashed line in FIG. 5A). The output voltage V1 is generated by a generator circuit (not shown), which is constituted by capacitors, resistors, and operational amplifiers, which are included in the bottom-hold circuit 64. The generator circuit is structured in advance such that, when the output voltage V2 of the bottom-hold circuit 64 is converted into a voltage value from which the influence of the temperature of the combustion pressure sensor 40 has been removed, the increase rate of the output voltage V1 becomes an adequate rate.

Then, the value (VO−V1) obtained by subtracting the output voltage V1 of the generator circuit from the output voltage VO of the output circuit 63 is output as the output voltage V2 from the bottom-hold circuit 64. Specifically, each time the output voltage VO of the output circuit 63 switches from decrease to increase, the output voltage V2 temporarily becomes a reference voltage value (0V) regardless of the temperature of the semiconductor device 50. Thereafter, the difference between the output voltage V1 of the generator circuit and the output voltage VO of the output circuit 63 is the output voltage V2. Accordingly, the output voltage V2 is a value from which the influence of the temperature of the semiconductor device 50 has been removed and a value that corresponds to the in-cylinder pressure. The output voltage V2 is generated, using the output voltages VO, V1, by a device such as an operational amplifier, which is included in the bottom-hold circuit 64.

When the in-cylinder pressure is detected to execute the various types of control processes, the output voltage V2 of the bottom-hold circuit 64 is detected as the in-cylinder pressure.

The present embodiment is configured to detect the temperature of the combustion chamber 15 using the output voltage VO of the output circuit 63 of the combustion pressure sensor 40.

A process for detecting the temperature of the combustion chamber 15 (temperature detection process) will now be described.

Figure 6:
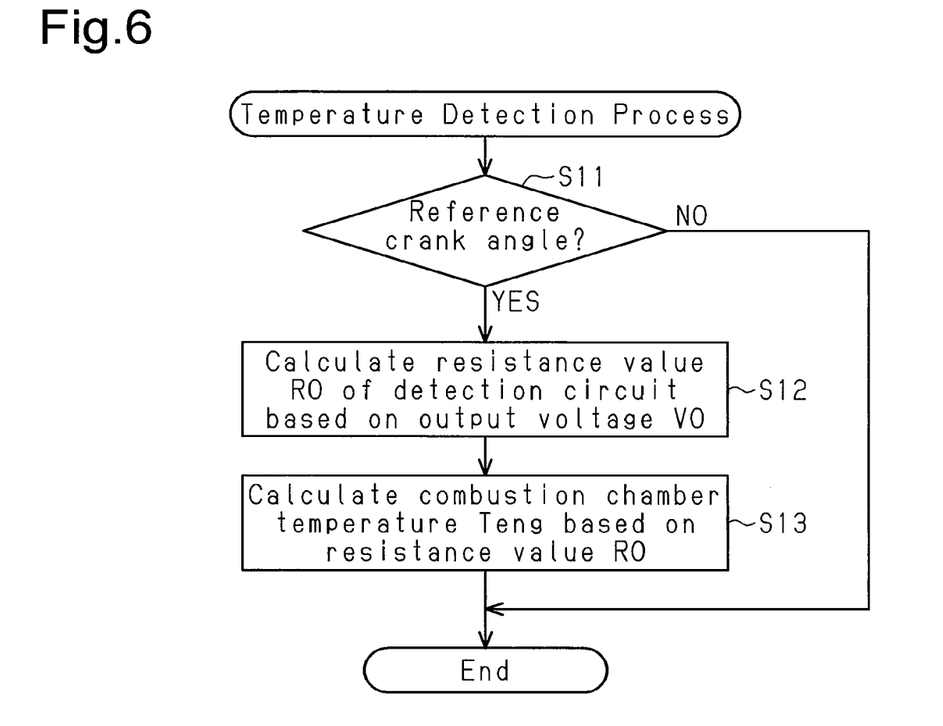
FIG. 6 is a flowchart showing an execution procedure of a temperature detection process.

FIG. 6 shows an execution procedure of the temperature detection process. The series of steps shown in the flowchart of FIG. 6 is executed as an interruption at predetermined intervals by the electronic control unit 38.

As shown in FIG. 6, the electronic control unit 38 first determines whether the crank angle is a predetermined reference crank angle (step S11). The reference crank angle is set to an arbitrary crank angle at which combustion pressure is not generated. In the present embodiment, the reference crank angle is set to an arbitrary crank angle in the intake stroke of the cylinder in which the combustion pressure sensor 40 is provided. The reference crank angle may be set to an arbitrary crank angle in any of the exhaust stroke, the intake stroke, and the compression stroke of the cylinder in which the combustion pressure sensor 40 is provided.

When the crank angle becomes the reference crank angle (step S11: YES), the electronic control unit 38 calculates the resistance value RO of the detection circuit 65 by utilizing Ohm's law (Voltage V=Resistance R×Current I) based on the output voltage VO of the detection circuit 65 of the combustion pressure sensor 40 (more specifically, the output circuit 63) at step S12. In the present embodiment, a constant current TO is supplied to the detection circuit 65. Taking this into consideration, the electronic control unit 38 calculates the resistance value RO of the detection circuit 65 from the relational expression "resistance value RO=Output Voltage VO/Current IO (constant)." Thereafter, based on the resistance value RO calculated at step S12, the electronic control unit 38 calculates the temperature of the combustion chamber 15 (more specifically, the inner wall of the combustion chamber 15), which is a combustion chamber temperature Teng, thereby detecting the temperature of the combustion chamber 15 (step S13).

Operation

The semiconductor device 50 has properties for changing the resistance value in accordance with both of the own temperature and deformation of the mesa portion 52 caused by the in-cylinder pressure acting via the diaphragm 43. Thus, if the in-cylinder pressure received by the semiconductor device 50 (specifically, the deformation of the mesa portion 52) is constant, the resistance value of the semiconductor device 50 remains unchanged regardless of the value of the in-cylinder pressure. Therefore, a temperature difference appears, without change, as the resistance value of the semiconductor device 50. Specifically, the output voltage VO of the output circuit 63 of the combustion pressure sensor 40 includes the influence of the in-cylinder pressure, which acts on the mesa portion 52 via the diaphragm 43, and the influence of the temperature of the semiconductor device 50. Thus, if the resistance value RO of the detection circuit 65 were calculated simply based on the output voltage VO, the resistance value RO would include the influence of the in-cylinder pressure, which acts on the diaphragm 43, and would not be calculated accurately.

When the combustion pressure does not act on the diaphragm 43, for example, during the exhaust stroke or the intake stroke of the internal combustion engine 10, the load acting on the semiconductor device 50 is significantly small, and the mesa portion 52 of the semiconductor device 50 is substantially not deformed. Thus, a temperature difference appears, without change, as the output voltage VO. In the present embodiment, the output voltage VO of the detection circuit 65 at the time when the crank angle is the reference crank angle, at which the combustion pressure does not act on the combustion pressure sensor 40, that is, at the time when the temperature difference appears, without change, as the resistance value of the semiconductor device 50 is used to calculate the resistance value RO of the detection circuit 65.

In the present embodiment, since a constant current is supplied to the detection circuit 65, the output voltage VO of the output circuit 63 changes in accordance with the temperature of the semiconductor device 50. Thus, the resistance value RO of the detection circuit 65 can be calculated based on the output voltage VO of the output circuit 63, and the temperature of the combustion pressure sensor 40 can be estimated based on the resistance value RO.

Figure 7:
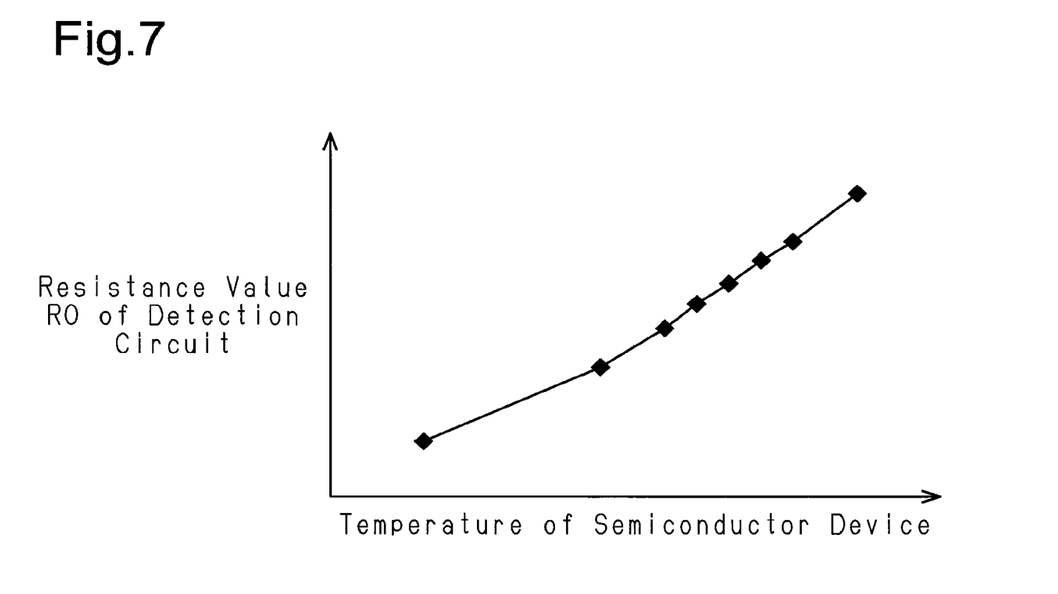
FIG. 7 is a graph showing the relationship between the temperature of the semiconductor device and the resistance value of the detection circuit.

Specifically, as shown in FIG. 7, the higher the temperature of the semiconductor device 50, the higher the resistance value RO of the detection circuit 65, which includes the semiconductor device 50, becomes. FIG. 7 shows results of measurement of the relationship between the temperature of the semiconductor device 50 and the resistance value RO of the detection circuit 65.

Taking the above into consideration, in the present embodiment, the resistance value RO of the detection circuit 65 is calculated based on the output voltage VO of the output circuit 63 at the time when the crank angle is the reference crank angle. Thus, the resistance value RO is calculated as a value from which the influence of the in-cylinder pressure acting on the mesa portion 52 via the diaphragm 43 is removed and as a value that corresponds to the temperature of the semiconductor device 50. Based on the resistance value RO, the temperature of the combustion chamber 15, which correlates with the temperature of the semiconductor device 50, is detected.

In the device of the present embodiment, when the temperature of the combustion pressure sensor 40 is obtained, the temperature of the combustion chamber 15 of the internal combustion engine 10, to which the combustion pressure sensor 40 is attached, is obtained. Taking these facts into consideration, in the present embodiment, the relationship between the resistance value RO of the detection circuit 65 and the temperature of the combustion chamber 15 (the combustion chamber temperature Teng) is obtained in advance based on results of experiments and simulations performed by the inventors, and the obtained relationship is stored in the electronic control unit 38 as the calculation map. At step S13 of the temperature calculation process (FIG. 6), the combustion chamber temperature Teng is calculated based on the calculation map.

As described above, in the present embodiment, in the device including the combustion pressure sensor 40, the temperature of the combustion chamber 15 of the internal combustion engine 10 is calculated and detected by using changes in the resistance value RO of the detection circuit 65 that accompany the temperature of the combustion pressure sensor 40. In the present embodiment, no additional structure needs to be added to the combustion pressure sensor 40 to detect the temperature of the combustion chamber 15 other than the detection circuit 65, which has the semiconductor device 50. This restrains the costs from increasing.

In the present embodiment, a process for suppressing knocking (knocking suppression process) is executed using the combustion chamber temperature Teng, which is detected through the temperature detection process.

Figure 8:
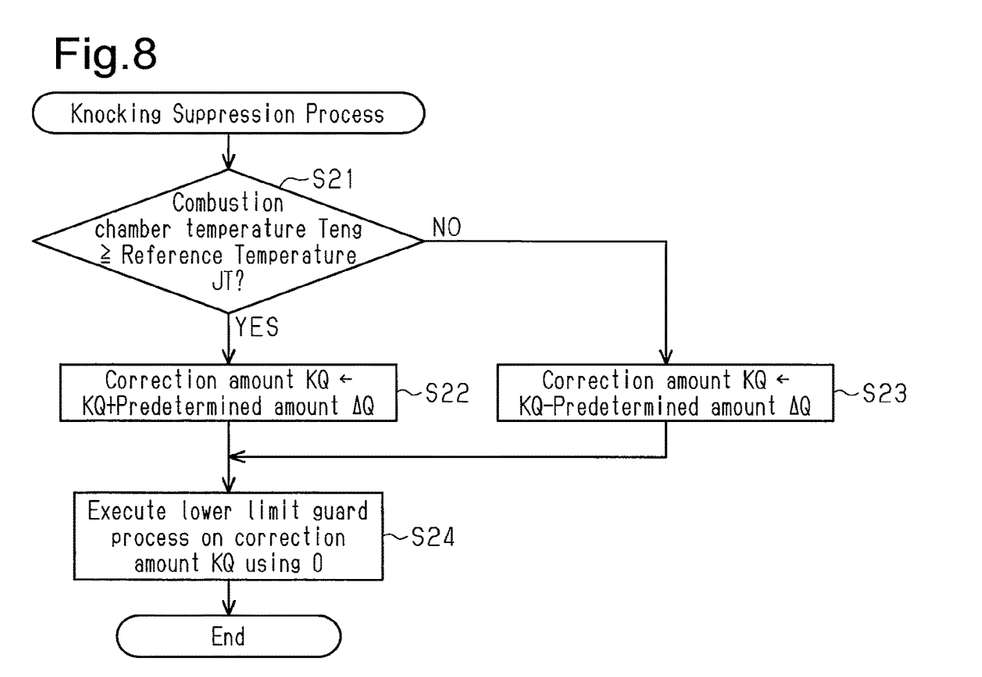
FIG. 8 is a flowchart showing an execution procedure of a knocking suppression process.

FIG. 8 shows an execution procedure of the knocking suppression process. The series of steps shown in the flowchart of FIG. 8 is a process executed as a part of the operation control of the injector 16 (fuel injection control) and is executed as an interruption at predetermined intervals by the electronic control unit 38.

As shown in FIG. 8, the electronic control unit 38 first determines whether the combustion chamber temperature Teng is higher than or equal to a reference temperature JT, at which knocking is predicted to occur (step S21). The reference temperature JT is set to a temperature that is slightly lower than the lower limit of the temperature range in which knocking can occur and is stored in the electronic control unit 38.

When the combustion chamber temperature Teng is higher than or equal to the reference temperature JT (step S21: YES), the electronic control unit 38 adds a predetermined amount ΔQ to a correction amount KQ (step S22). In contrast, when the combustion chamber temperature Teng is lower than the reference temperature JT (step S21: NO), the electronic control unit 38 subtracts the predetermined amount ΔQ from the correction amount KQ (step S23).

After the correction amount KQ is increased or reduced in the above-described manner, the electronic control unit 38 executes a lower limit guard process on the correction amount KQ using 0 (step S24). Specifically, when the correction amount KQ has a negative value, the electronic control unit 38 sets 0 as a new correction amount KQ. In contrast, when the correction amount KQ has a value equal to or greater than 0, the electronic control unit 38 sets that value as the correction amount KQ without change.

In the present embodiment, the correction amount KQ is added to a control target value (target injection amount Tq) of the fuel injection amount from the injector 16, and the resultant value is set as a new target injection amount Tq. The target injection amount Tq is thus increased.

When the combustion chamber temperature Teng, which is detected by using the combustion pressure sensor 40, is high and knocking is likely to occur, the fuel injection amount is increased to increase the latent heat of vaporization of the fuel. The temperature in the combustion chamber 15 is thus lowered. Therefore, the occurrence of knocking in the internal combustion engine 10 is suppressed in accordance with the actually detected temperature of the combustion chamber 15.

As described above, the present embodiment achieves the following advantages.

(1) The combustion chamber temperature Teng is detected by calculating the combustion chamber temperature Teng based on the output voltage VO of the detection circuit 65 at the time when the combustion pressure of the internal combustion engine 10 is not acting on the diaphragm 43 of the combustion pressure sensor 40. Thus, in the device including the combustion pressure sensor 40, the temperature of the combustion chamber 15 of the internal combustion engine 10 is detected by using changes in the resistance value RO of the detection circuit 65 that accompany the temperature of the combustion pressure sensor 40. The combustion pressure sensor 40 functions as a sensor that detects the combustion pressure of the combustion chamber 15 and a sensor that detects the temperature of the combustion chamber 15. In the present embodiment, no additional structure needs to be added to the combustion pressure sensor 40 to detect the temperature of the combustion chamber 15 other than the detection circuit 65, which has the semiconductor device 50. This restrains the costs from increasing.

(2) The fuel injection amount of the internal combustion engine 10 is increased when the combustion chamber temperature Teng has become higher than or equal to the reference temperature JT, at which knocking is predicted to occur. Therefore, the occurrence of knocking in the internal combustion engine 10 is suppressed in accordance with the actually detected temperature of the combustion chamber 15.

The above embodiment may be modified as follows.

Step S11 in the temperature detection process (FIG. 6) may be changed as long as it is possible to determine that the combustion pressure of the internal combustion engine 10 is not acting on the diaphragm 43 of the combustion pressure sensor 40. For example, at step S11, it may be determined whether the crank angle is a reference crank angle in the exhaust stroke of the cylinder in which the combustion pressure sensor 40 is provided. In this case, the reference crank angle may be set to an arbitrary crank angle in the exhaust stroke of the cylinder in which the combustion pressure sensor 40 is provided.

The device of the above-described embodiment is applicable to a device that employs a combustion pressure sensor having no bottom-hold circuit 64.

The temperature of the combustion chamber 15 may be calculated in the following manner. Specifically, the temperature of the semiconductor device 50 is calculated using a calculation map or a relational expression based on the resistance value RO of the detection circuit 65, and the temperature of the combustion chamber 15 is calculated using a calculation map or a relational expression based on the temperature of the semiconductor device 50. This device calculates the temperature of the semiconductor device 50 in the process of calculating the temperature of the combustion chamber 15. Accordingly, various types of processes can be executed using the temperature of the semiconductor device 50. For example, a process may be executed to determine that the temperature of the semiconductor device 50 is excessively high.

The knocking suppression process is not limited to the process for increasing the fuel injection amount, but may be a process for reducing the opening degree of the throttle valve 13 (the throttle opening degree).

Figure 9:
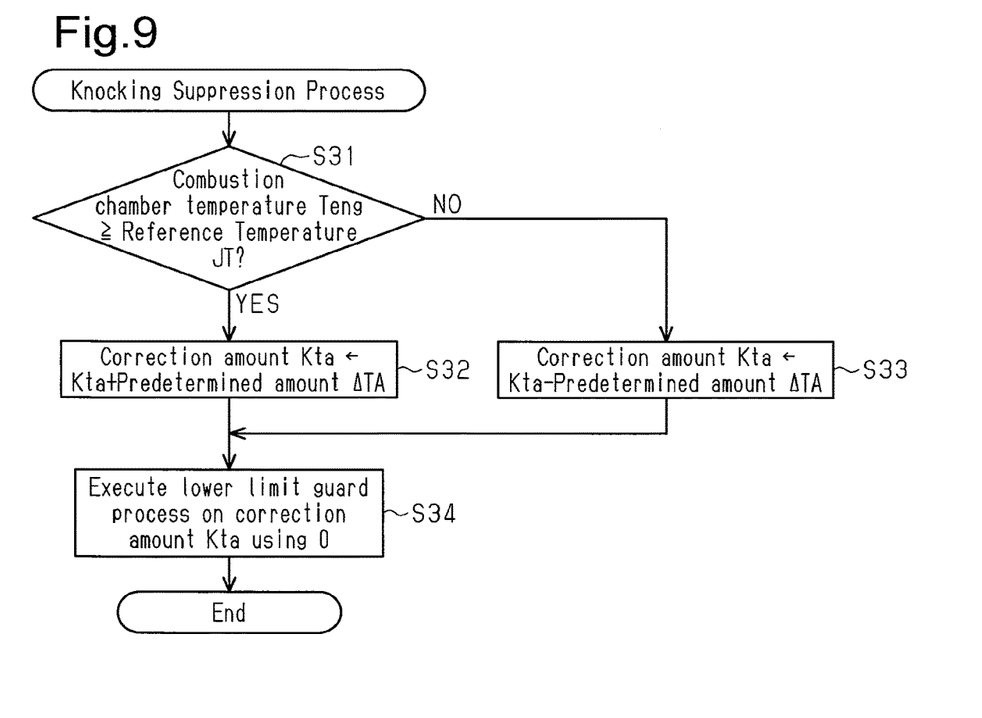
FIG. 9 is a flowchart showing an execution procedure of a knocking suppression process of a modification.

FIG. 9 shows such an execution procedure of the knocking suppression process. The series of steps shown in the flowchart of FIG. 9 is a process executed as a part of the operation control of the throttle valve 13 (throttle control) and is executed as an interruption at predetermined intervals by the electronic control unit 38.

As shown in FIG. 9, the electronic control unit 38 first determines whether the combustion chamber temperature Teng is higher than or equal to a reference temperature JT, at which knocking is predicted to occur (step S31). When the combustion chamber temperature Teng is higher than or equal to the reference temperature JT (step S31: YES), the electronic control unit 38 adds a predetermined amount ΔTA to a correction amount Kta (step S32). In contrast, when the combustion chamber temperature Teng is lower than the reference temperature JT (step S31: NO), the electronic control unit 38 subtracts the predetermined amount ΔTA from the correction amount Kta (step S33). After the correction amount Kta is increased or reduced in the above-described manner, the electronic control unit 38 executes a lower limit guard process on the correction amount Kta using 0 (step S34). Specifically, when the correction amount Kta has a negative value, the electronic control unit 38 sets 0 as a new correction amount Kta. In contrast, when the correction amount Kta has a value equal to or greater than 0, the electronic control unit 38 sets that value as the correction amount Kta without change. In the present embodiment, the correction amount Kta is subtracted from a control target value (target throttle opening degree Tta) of the opening degree of the throttle valve 13, and the resultant value is set as a new target throttle opening degree Tta. The target throttle opening degree Tta is thus reduced.

Accordingly, when the combustion chamber temperature Teng, which is detected by using the combustion pressure sensor 40, is high and knocking is likely to occur, the opening degree of the throttle valve 13 is reduced to reduce the intake air amount of the internal combustion engine 10. The temperature in the combustion chamber 15 is thus lowered. Therefore, the occurrence of knocking in the internal combustion engine 10 is suppressed in accordance with the actually detected temperature of the combustion chamber 15.

As the knocking suppression process, a process for retarding the ignition timing of the internal combustion engine 10 may be executed.

Figure 10:
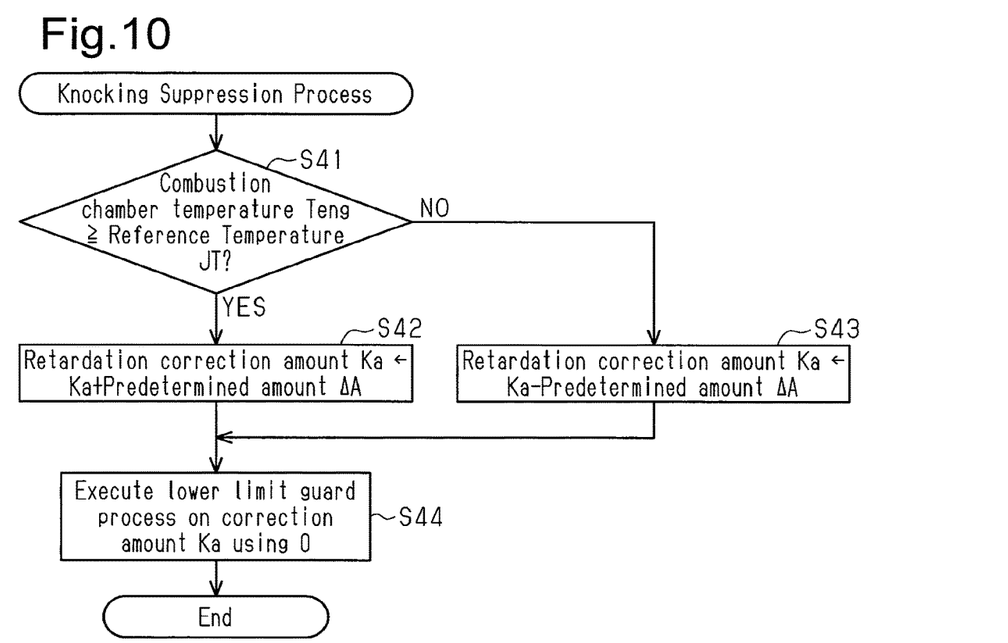
FIG. 10 is a flowchart showing an execution procedure of a knocking suppression process of a modification.

FIG. 10 shows such an execution procedure of the knocking suppression process. The series of steps shown in the flowchart of FIG. 10 is a process executed as a part of the operation control of the ignition plug 17 (injection timing control) and is executed as an interruption at predetermined intervals by the electronic control unit 38.

As shown in FIG. 10, the electronic control unit 38 first determines whether the combustion chamber temperature Teng is higher than or equal to a reference temperature JT, at which knocking is predicted to occur (step S41). When the combustion chamber temperature Teng is higher than or equal to the reference temperature JT (step S41: YES), the electronic control unit 38 adds a predetermined amount ΔA to a retardation correction amount Ka (step S42). In contrast, when the combustion chamber temperature Teng is lower than the reference temperature JT (step S41: NO), the electronic control unit 38 subtracts the predetermined amount ΔA from the retardation correction amount Ka (step S43). After the retardation correction amount Ka is increased or reduced in the above-described manner, the electronic control unit 38 executes a lower limit guard process on the retardation correction amount Ka using 0 (step S44). Specifically, when the retardation correction amount Ka has a negative value, the electronic control unit 38 sets 0 as a new retardation correction amount Ka. In contrast, when the retardation correction amount Ka has a value equal to or greater than 0, the electronic control unit 38 sets that value as the retardation correction amount Ka. In the present embodiment, the retardation correction amount Ka is subtracted from a control target value of the ignition timing (target injection timing Ta), and the resultant value is set as a new target ignition timing Ta. The target ignition timing Ta is thus retarded by the retardation correction amount Ka.

Accordingly, when the combustion chamber temperature Teng, which is detected by using the combustion pressure sensor 40, is high and knocking is likely to occur, the ignition timing is retarded to reduce the peak value of the pressure in the combustion chamber 15. The temperature in the combustion chamber 15 is thus lowered. Therefore, the occurrence of knocking in the internal combustion engine 10 is suppressed in accordance with the actually detected temperature of the combustion chamber 15.

As the knocking suppression process, a process for increasing the amount of coolant delivered by the water pump 37 may be executed.

Figure 11:
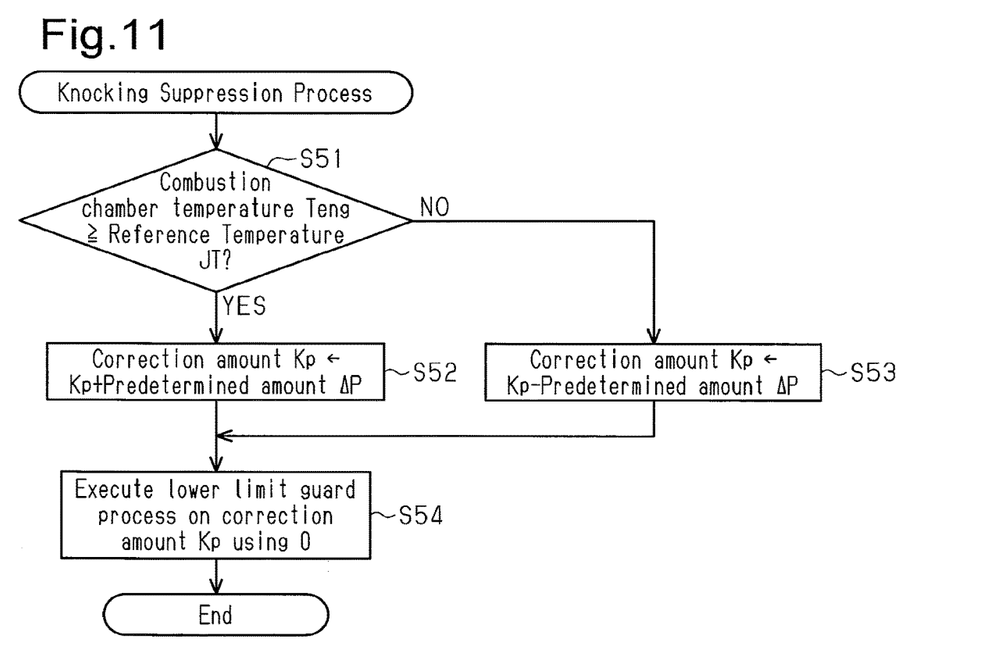
FIG. 11 is a flowchart showing an execution procedure of a knocking suppression process of a modification.

FIG. 11 shows such an execution procedure of the knocking suppression process. The series of steps shown in the flowchart of FIG. 11 is a process executed as a part of the operation control of the water pump 37 and is executed as an interruption at predetermined intervals by the electronic control unit 38.

As shown in FIG. 11, the electronic control unit 38 first determines whether the combustion chamber temperature Teng is higher than or equal to a reference temperature JT, at which knocking is predicted to occur (step S51). When the combustion chamber temperature Teng is higher than or equal to the reference temperature JT (step S51: YES), the electronic control unit 38 adds a predetermined amount ΔP to a correction amount Kp (step S52). In contrast, when the combustion chamber temperature Teng is lower than the reference temperature JT (step S51: NO), the electronic control unit 38 subtracts the predetermined amount ΔP from the correction amount Kp (step S53). After the correction amount Kp is increased or reduced in the above-described manner, the electronic control unit 38 executes a lower limit guard process on the correction amount Kp using 0 (step S54). Specifically, when the correction amount Kp has a negative value, the electronic control unit 38 sets 0 as a new correction amount Kp. In contrast, when the correction amount Kp has a value equal to or greater than 0, the electronic control unit 38 sets that value as the correction amount Kp without change. In the present embodiment, the correction amount Kp is added to a control target value of the operation amount of the water pump 37 (target pump operation amount Tp), and the resultant value is set as a new target pump actuation amount Tp. The target pump actuation amount Tp is thus increased by the correction amount Kp.

Accordingly, when the combustion chamber temperature Teng, which is detected by using the combustion pressure sensor 40, is high and knocking is likely to occur, the actuation amount of the water pump 37 is increased to increase the cooling effect of the intake air amount of the internal combustion engine 10 by coolant. The temperature in the combustion chamber 15 is thus lowered. Therefore, the occurrence of knocking in the internal combustion engine 10 is suppressed in accordance with the actually detected temperature of the combustion chamber 15.

As the knocking suppression process, a process for reducing the valve duration VL of the intake valve 21 may be executed.

Figure 12:
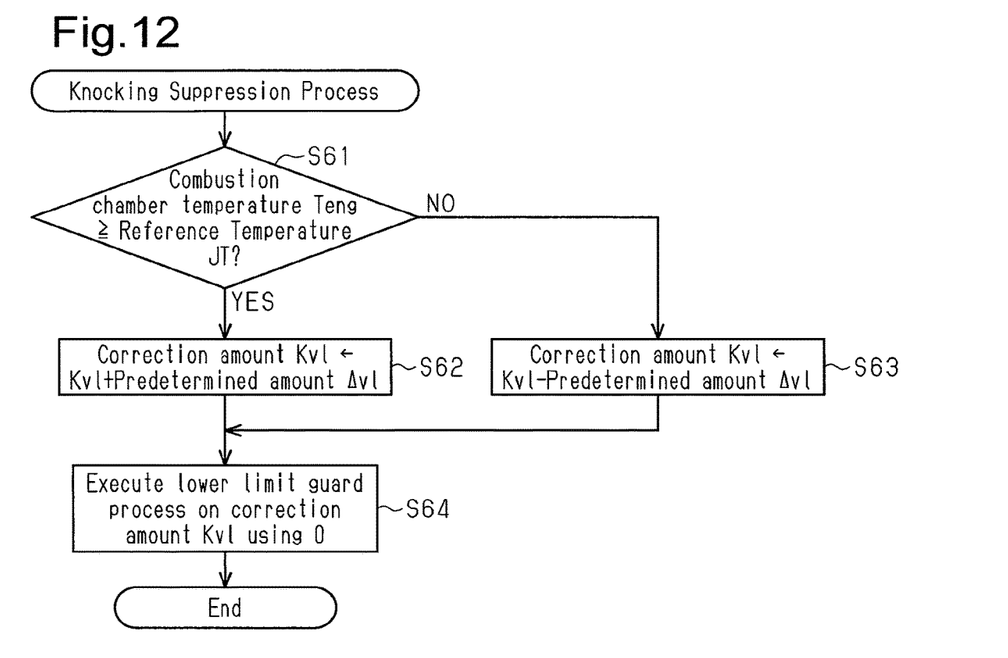
FIG. 12 is a flowchart showing an execution procedure of a knocking suppression process of a modification.

FIG. 12 shows such an execution procedure of the knocking suppression process. The series of steps shown in the flowchart of FIG. 12 is a process executed as a part of the operation control of the variable valve duration mechanism 27 and is executed as an interruption at predetermined intervals by the electronic control unit 38.

As shown in FIG. 12, the electronic control unit 38 first determines whether the combustion chamber temperature Teng is higher than or equal to a reference temperature JT, at which knocking is predicted to occur (step S61). When the combustion chamber temperature Teng is higher than or equal to the reference temperature JT (step S61: YES), the electronic control unit 38 adds a predetermined amount Δv1 to a correction amount Kv1 (step S62). In contrast, when the combustion chamber temperature Teng is lower than the reference temperature JT (step S61: NO), the electronic control unit 38 subtracts the predetermined amount Δv1 from the correction amount Kv1 (step S63). After the correction amount Kv1 is increased or reduced in the above-described manner, the electronic control unit 38 executes a lower limit guard process on the correction amount Kv1 using 0 (step S64). Specifically, when the correction amount Kv1 has a negative value, the electronic control unit 38 sets 0 as a new correction amount Kv1. In contrast, when the correction amount Kv1 has a value equal to or greater than 0, the electronic control unit 38 sets that value as the correction amount Kv1 without change. In the present embodiment, the correction amount Kv1 is subtracted from a control target value (target valve duration Tv1) of the valve duration VL of the intake valve 21, and the resultant value is set as a new target valve duration Tv1. The target valve duration Tv1 is thus reduced.

Accordingly, when the combustion chamber temperature Teng, which is detected by using the combustion pressure sensor 40, is high and knocking is likely to occur, the valve duration VL of the intake valve 21 is reduced to reduce the intake air amount. The temperature in the combustion chamber 15 is thus lowered. Therefore, the occurrence of knocking in the internal combustion engine 10 is suppressed in accordance with the actually detected temperature of the combustion chamber 15.

In conjunction with such an operation control for the variable valve duration mechanism 27, an operation control for the variable valve timing mechanism 25 may be performed such that the greater the correction amount Kv1, the more advanced the control target value of the intake valve timing VT becomes. The device having such a configuration changes the intake valve timing VT in accordance with changes in the valve duration VL of the intake valve 21, thereby adequately setting the valve overlap amount.

As the knocking suppression process, a process for increasing the EGR amount may be executed.

Figure 13:
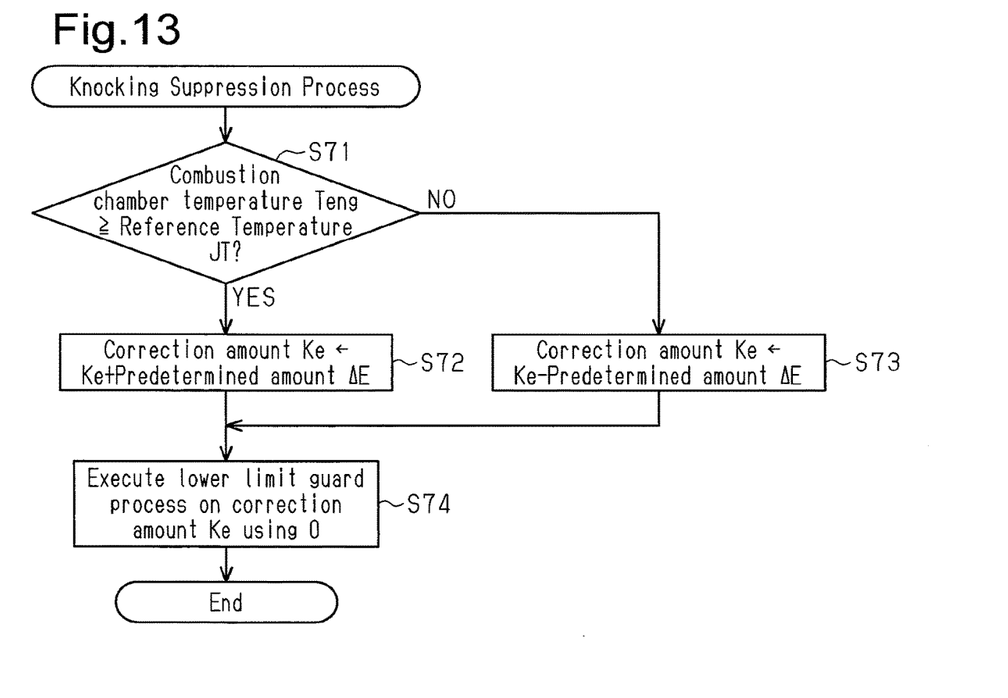
FIG. 13 is a flowchart showing an execution procedure of a knocking suppression process of a modification.

FIG. 13 shows such an execution procedure of the knocking suppression process. The series of steps shown in the flowchart of FIG. 13 is a process executed as a part of the operation control of the EGR valve 31 and is executed as an interruption at predetermined intervals by the electronic control unit 38.

As shown in FIG. 13, the electronic control unit 38 first determines whether the combustion chamber temperature Teng is higher than or equal to a reference temperature JT, at which knocking is predicted to occur (step S71). When the combustion chamber temperature Teng is higher than or equal to the reference temperature JT (step S71: YES), the electronic control unit 38 adds a predetermined amount ΔE to a correction amount Ke (step S72). In contrast, when the combustion chamber temperature Teng is lower than the reference temperature JT (step S71: NO), the electronic control unit 38 subtracts the predetermined amount ΔE from the correction amount Ke (step S73). After the correction amount Ke is increased or reduced in the above-described manner, the electronic control unit 38 executes a lower limit guard process on the correction amount Ke using 0 (step S74). Specifically, when the correction amount Ke has a negative value, the electronic control unit 38 sets 0 as a new correction amount Ke. In contrast, when the correction amount Ke has a value equal to or greater than 0, the electronic control unit 38 sets that value as the correction amount Ke without change. In the present embodiment, the correction amount Ke is added to a control target value (target EGR opening degree Te) of the opening degree of the EGR valve 31, and the resultant value is set as a new target EGR opening degree Te. The target EGR opening degree Te is thus increased.

Accordingly, when the combustion chamber temperature Teng, which is detected by using the combustion pressure sensor 40, is high and knocking is likely to occur, the EGR amount is increased to increase the heat capacity of the gas in the combustion chamber 15. The temperature in the combustion chamber 15 is thus lowered. Therefore, the occurrence of knocking in the internal combustion engine 10 is suppressed in accordance with the actually detected temperature of the combustion chamber 15.

As the knocking suppression process, a process for reducing the amount of forced induction by the turbocharger 32 may be executed.

Figure 14:
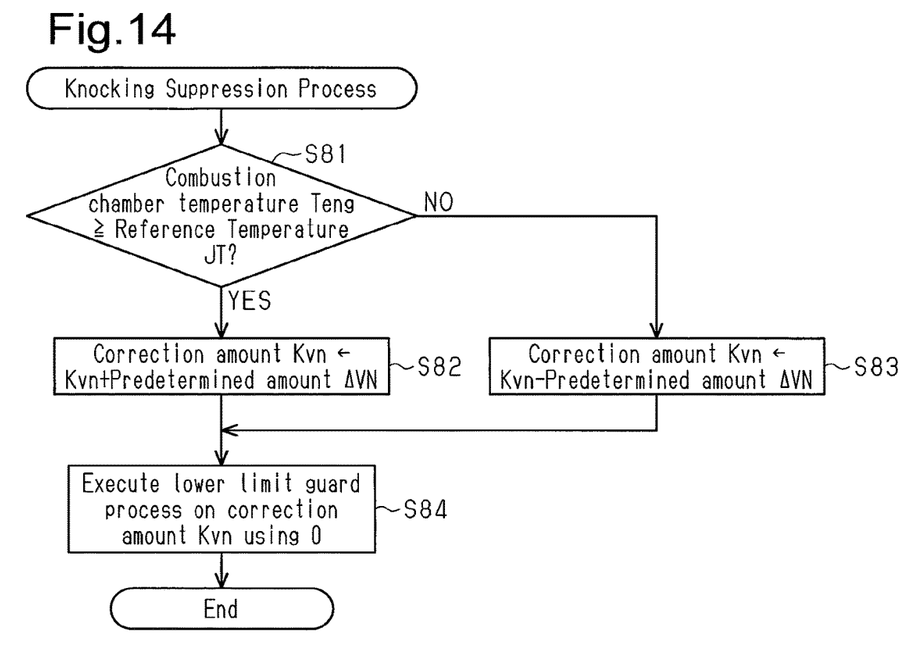
FIG. 14 is a flowchart showing an execution procedure of a knocking suppression process of a modification.

FIG. 14 shows such an execution procedure of the knocking suppression process. The series of steps shown in the flowchart of FIG. 14 is a process executed as a part of the operation control of the turbocharger 32 and is executed as an interruption at predetermined intervals by the electronic control unit 38.

As shown in FIG. 14, the electronic control unit 38 first determines whether the combustion chamber temperature Teng is higher than or equal to a reference temperature JT, at which knocking is predicted to occur (step S81). When the combustion chamber temperature Teng is higher than or equal to the reference temperature JT (step S81: YES), the electronic control unit 38 adds a predetermined amount ΔVN to a correction amount Kvn (step S82). In contrast, when the combustion chamber temperature Teng is lower than the reference temperature JT (step S81: NO), the electronic control unit 38 subtracts the predetermined amount ΔVN from the correction amount Kvn (step S83). After the correction amount Kvn is increased or reduced in the above-described manner, the electronic control unit 38 executes a lower limit guard process on the correction amount Kvn using 0 (step S84). Specifically, when the correction amount Kvn has a negative value, the electronic control unit 38 sets 0 as a new correction amount Kvn. In contrast, when the correction amount Kvn has a value equal to or greater than 0, the electronic control unit 38 sets that value as the correction amount Kvn without change. In the present embodiment, the correction amount Kvn is added to a control target value (target nozzle opening degree Tvn) of the opening degree of the nozzle vanes, and the resultant value is set as a new target nozzle opening degree Tvn. The target nozzle opening degree Tvn is thus increased.

Accordingly, when the combustion chamber temperature Teng, which is detected by using the combustion pressure sensor 40, is high and knocking is likely to occur, the amount of the forced induction by the turbocharger 32 is reduced. The temperature in the combustion chamber 15 is thus lowered. Therefore, the occurrence of knocking in the internal combustion engine 10 is suppressed in accordance with the actually detected temperature of the combustion chamber 15.

The relationship between the output voltage VO of the output circuit 63 and the temperature of the combustion chamber 15 may be obtained in advance through a calculation map or an arithmetic expression, and the temperature of the combustion chamber 15 may be calculated based on the output voltage VO by using the calculation map or the arithmetic expression. Since the supply current of the detection circuit 65 is constant in the device of the above-described embodiment, the resistance value RO of the detection circuit 65 is obtained when the output voltage VO of the output circuit 63 is obtained. Thus, since the output voltage VO is used as an index value for the resistance value RO, the temperature of the combustion pressure sensor 40 and thus the temperature of the combustion chamber 15 are calculated and detected based on the output voltage VO. In this manner, the output voltage VO of the output circuit 63 of the semiconductor device 50 is dependent on the temperature of the mesa portion 52 of the semiconductor device 50 in the device of the above-described embodiment. Therefore, based on results of various types of experiments and simulations, the relationship between the output voltage VO of the output circuit 63 and the temperature of the combustion chamber 15 (the combustion chamber temperature Teng) is obtained in advance, and the obtained relationship is stored in the electronic control unit 38 as a calculation map or a relational expression. This allows the combustion chamber temperature Teng to be accurately calculated based on the output voltage VO by using the calculation map or the relational expression.

The device of the above-described embodiment can be applied, if modified as necessary, to a device in which a power source of a constant voltage is connected to the semiconductor device 50 and a combustion pressure sensor is used in which a detection circuit having the semiconductor device 50 outputs a current corresponding to the in-cylinder pressure of the internal combustion engine 10. In such a device, it suffices that the resistance value of the detection circuit be calculated based on the output current of the detection circuit at the time when the combustion pressure is not acting on the diaphragm 43 of the combustion pressure sensor and that the temperature of the combustion chamber 15 be calculated based on the resistance value.

In the above-described device, since a constant voltage is applied to the semiconductor device 50, the output voltage of the output circuit changes in accordance with the temperature of the semiconductor device 50. Therefore, the resistance value of the detection circuit can be calculated by utilizing Ohm's law (Voltage V=Resistance R×Current I) based on the output current of the detection circuit, and the temperature of the combustion pressure sensor and thus the temperature of the combustion chamber 15 can be estimated based on the resistance value.

In the above-described device, the resistance value of the detection circuit can be calculated based on the output current of the detection circuit when the combustion pressure is not acting on the diaphragm 43 of the combustion pressure sensor, that is, when the temperature difference appears, without change, as the resistance value of the semiconductor device 50 since the load acting on the semiconductor device 50 is significantly small so that the semiconductor device 50 is substantially not deformed. Based on the resistance value, the temperature of the combustion chamber 15, which correlates with the temperature of the semiconductor device 50, is detected.

Also, in the above-described device, the relationship between the output current of the detection circuit and the temperature of the combustion chamber 15 may be obtained through a calculation map or an arithmetic expression, and the temperature of the combustion chamber 15 may be calculated based on the output current of the detection circuit by using the calculation map or the arithmetic expression.

In the above-described device, since the voltage applied to the semiconductor device 50 is constant, the resistance value of the detection circuit is obtained if the output current of the detection circuit is obtained. Thus, since the output current is used as an index value for the resistance value, the temperature of the combustion pressure sensor and thus the temperature of the combustion chamber 15 are calculated and detected based on the output current. In this manner, it can be said that, in the above-described device, the output current of the detection circuit of the semiconductor device is a value that is dependent on the temperature of the mesa portion 52 of the semiconductor device. Therefore, based on results of various types of experiments and simulations, the relationship between the output current of the detection circuit and the temperature of the combustion chamber 15 is obtained in advance, and the obtained relationship is stored in the electronic control unit 38 as a calculation map or a relational expression. This allows the temperature of the combustion chamber 15 to be accurately calculated based on the output current by using the calculation map or the relational expression.

Therefore, the present examples and embodiments are to be considered as illustrative and not restrictive and the invention is not to be limited to the details given herein, but may be modified within the scope and equivalence of the appended claims.

The invention claimed is:

1. A controller for an internal combustion engine, comprising:
    a combustion pressure sensor, which includes
        a pressure receiver, which is configured to be arranged in a combustion chamber of the internal combustion engine and receives an internal pressure of the combustion chamber,
        a semiconductor device, wherein the internal pressure applied to the pressure receiver is transmitted to the semiconductor device, and a resistance value of the semiconductor device is changed in accordance with both of an own temperature and an own deformation caused by the transmitted internal pressure, and
        a detection circuit, which outputs power in accordance with the pressure applied to the pressure receiver and the temperature of the semiconductor device; and
    a temperature calculator, which is configured to calculate a temperature of the combustion chamber based on an output of the detection circuit at the time when a combustion pressure of the internal combustion engine is not acting on the pressure receiver.

2. The controller for an internal combustion engine according to claim 1, wherein
    the combustion pressure sensor is configured such that a constant current is supplied to the detection circuit, and
    the temperature calculator is configured to calculate the temperature of the combustion chamber by using an output voltage of the detection circuit as the output of the detection circuit.

3. The controller for an internal combustion engine according to claim 1, wherein
    the controller is configured to calculate the temperature of the combustion chamber based on the output of the detection circuit at the time when a crank angle is a reference crank angle at which the combustion pressure does not act on the combustion pressure sensor.

4. The controller for an internal combustion engine according to claim 3, wherein
    the reference crank angle is set to an arbitrary crank angle in any of an exhaust stroke, an intake stroke, and a compression stroke of a cylinder in which the combustion pressure sensor is provided.

5. The controller for an internal combustion engine according to claim 1, wherein
    the controller is configured to lower the temperature of the combustion chamber when the temperature of the combustion chamber, which is calculated by the temperature calculator, has become higher than or equal to a temperature at which knocking is predicted to occur.

6. The controller for an internal combustion engine according to claim 5, wherein
    the controller is configured to increase a fuel injection amount of the internal combustion engine when the temperature of the combustion chamber, which is calculated by the temperature calculator, has become higher than or equal to the temperature at which knocking is predicted to occur.

7. The controller for an internal combustion engine according to claim 5, wherein
    the controller is configured to reduce an intake air amount of the internal combustion engine when the temperature of the combustion chamber, which is calculated by the temperature calculator, has become higher than or equal to the temperature at which knocking is predicted to occur.

8. The controller for an internal combustion engine according to claim 5, wherein
    the internal combustion engine has an ignition plug, and
    the controller is configured to retard ignition timing of the ignition plug when the temperature of the combustion chamber, which is calculated by the temperature calculator, has become higher than or equal to the temperature at which knocking is predicted to occur.

9. The controller for an internal combustion engine according to claim 5, wherein
    the internal combustion engine has a water pump, and
    the controller is configured to increase an operation amount of the water pump when the temperature of the combustion chamber, which is calculated by the temperature calculator, has become higher than or equal to the temperature at which knocking is predicted to occur.

10. The controller for an internal combustion engine according to claim 5, wherein
    the internal combustion engine has an exhaust gas recirculation device, and
    the controller is configured to increase an exhaust gas recirculation amount when the temperature of the combustion chamber, which is calculated by the temperature calculator, has become higher than or equal to the temperature at which knocking is predicted to occur.

11. The controller for an internal combustion engine according to claim 5, wherein
    the internal combustion engine has a turbocharger, and
    the controller is configured to reduce an amount of forced induction by the turbocharger when the temperature of the combustion chamber, which is calculated by the temperature calculator, has become higher than or equal to the temperature at which knocking is predicted to occur.

\* \* \* \* \*